Patented May 20, 1952

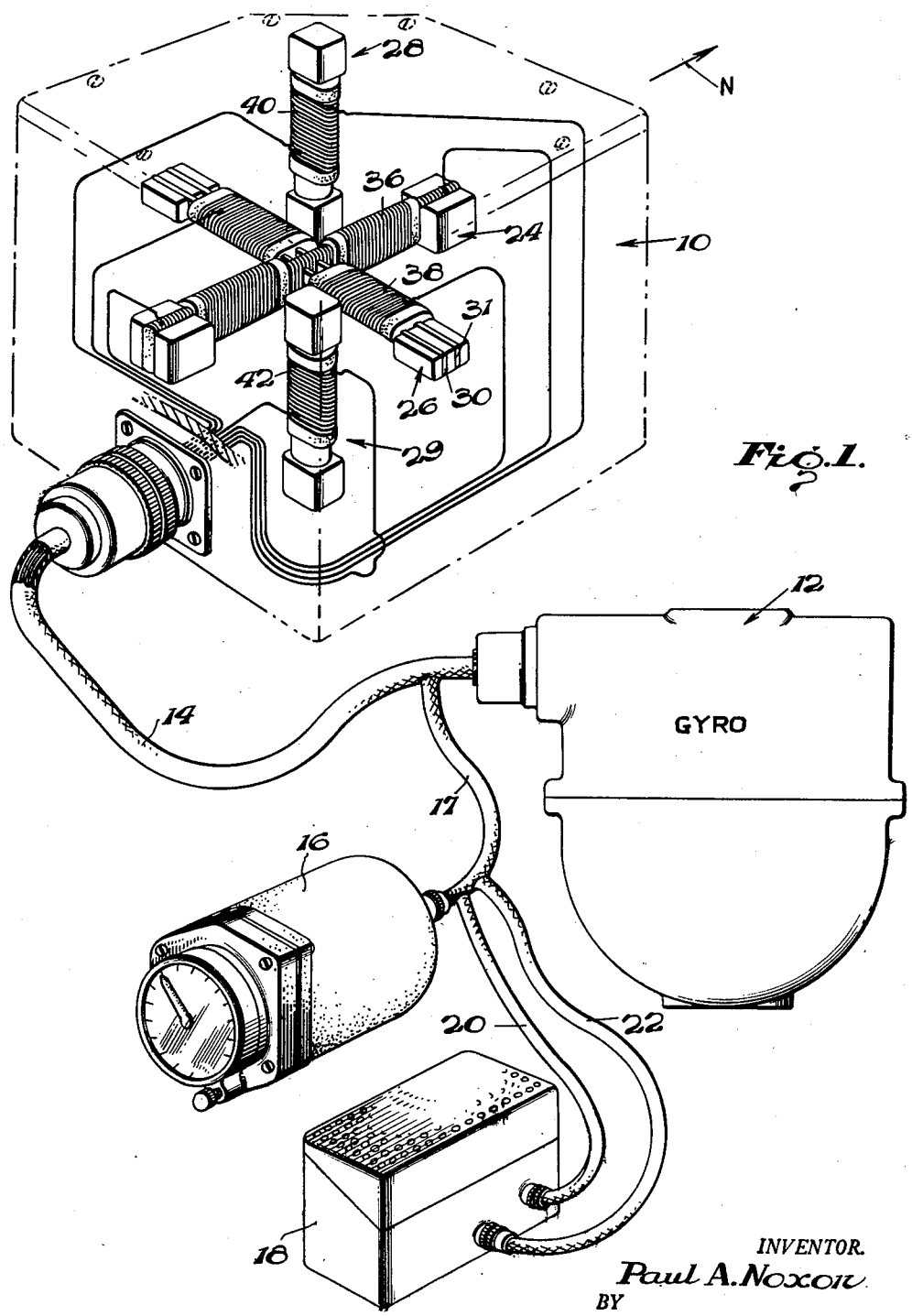

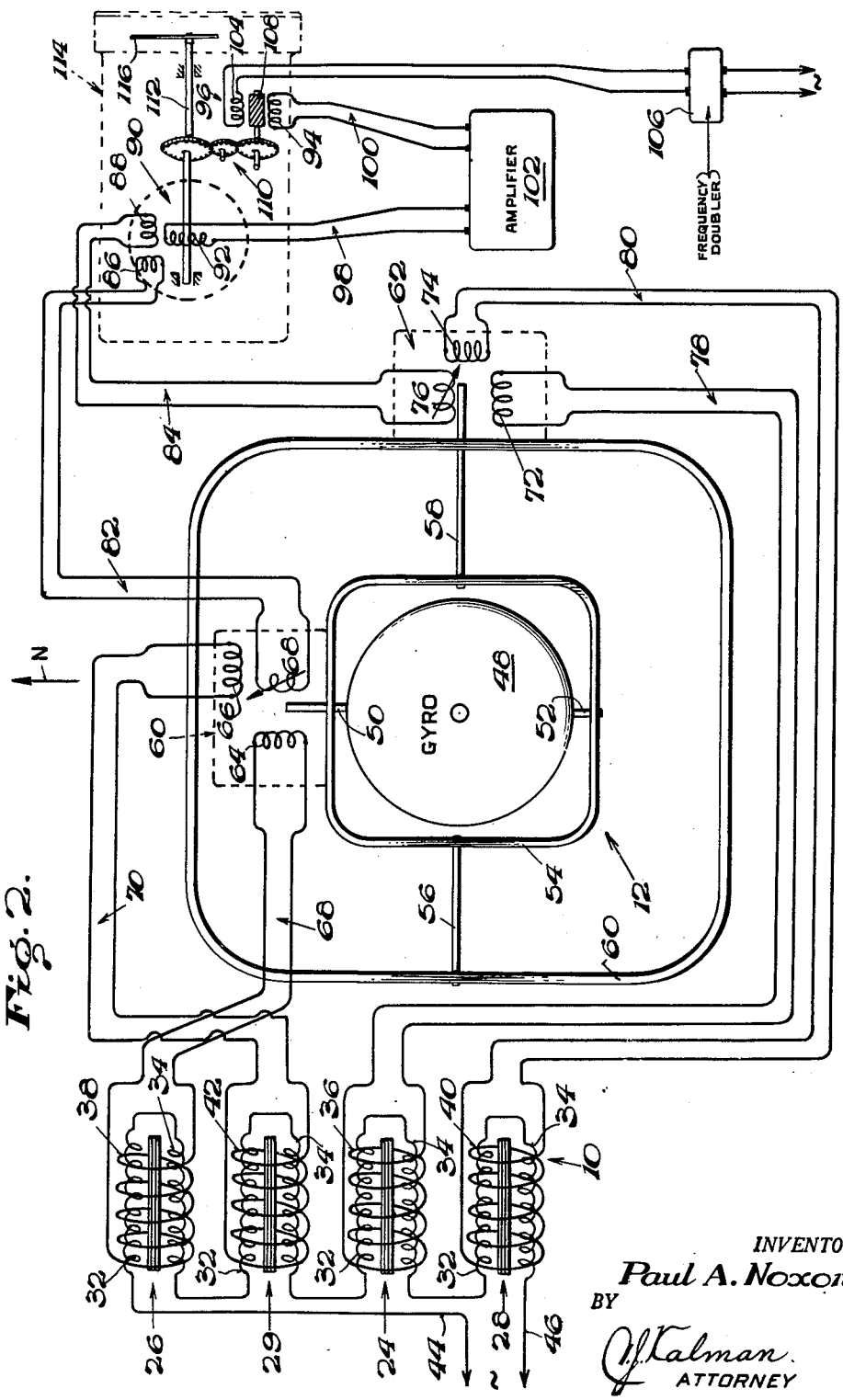

2,597,125

UNITED STATES PATENT OFFICE 2,597,125

EARTH INDUCTION SYSTEM

Paul A. Noxon, Tenafly, N. J., assignor to Bendix Aviation Corporation, Teterboro, N. J., a corporation of Delaware Application April 18, 1945, Serial No. 589,031

16 Claims. (Cl. 33—224)

1

This invention relates to compass systems and more particularly to that class of devices wherein an earth inductor or magnetic pick-up is employed for the measurement of the direction of the earth's magnetic field and which may, if desired, be utilized to secure a controlling function for the automatic piloting of vehicles such as marine craft or aircraft.

It has heretofore been proposed to utilize an earth inductor member or magnetic pick-up comprising a plurality of stationary cores together with primary and secondary windings, so arranged and constituted, that with the device maintained in a horizontal plane, indications of the direction of the horizontal component of the earth's magnetic field may be readily obtained. In using such prior devices on aircraft for example, it was found to be desirable to mount the device in the wing or tail of the craft so as to be as far removed as possible from the local magnetic effects due to the engine, accessory equipment, etc. Since the accuracy of such devices would be adversely affected by undesirable magnetic components, such as the vertical components of the earth's magnetic field, it was necessary to associate the pick-up device with a stabilizing mechanism such as an artificial horizon gyroscope, which functioned to maintain the device in a horizontal plane irrespective of pitch and bank movements of the craft.

While a considerable measure of success has been achieved with gyro-stabilized magnetic pick-ups or earth inductors of the type just described, still the system had one disadvantage for the reason that, with a gyroscopic device positioned remotely from the center of gravity of the craft, as such prior systems required, such device was subjected to disturbing forces, such as acceleration forces, during pitching and banking, and such forces would cause precession of the gyroscope and introduce serious errors in the directional indications of the pick-up. Moreover, with such remote location of the gyroscope, ready accessibility for inspection and repair was prevented.

It is accordingly one of the objects of the present invention to provide a novel compass system of the above general type, which is so constructed and arranged as to avoid the aforesaid difficulties and disadvantages.

Another object of the invention is to provide a novel compass system including a magnetic pick-up or earth inductor in combination with a gyroscope which may be located remotely from the pick-up and generally in proximity to the

2 center of gravity of the craft, where it will not be subjected to the objectionable acceleration forces as heretofore.

A further object is to provide an arrangement of the foregoing character for aircraft and other vehicles, including a magnetic pick-up or earth inductor which may be fixedly located in the wing or tail of the craft, together with circuit connections including electrical means controlled by a gyroscope positioned within the craft at or closely adjacent the center of gravity thereof, for compensating for any response of the pick-up to magnetic components other than the earth's horizontal component.

A still further object comprehends a system of the above type wherein the magnetic pick-up or earth inductor, due to pitch or bank movements of the craft, may respond to the vertical as well as the horizontal component of the earth's field, but wherein the remotely positioned gyroscope serves to compensate or nullify the effect of the undesired vertical component upon the indicating or control system, so that the latter only reflects the function of the horizontal component.

Still another object includes the provision of an arrangement of the foregoing character embodying a novel construction associated with the gyroscope, whereby the undesirable response of the magnetic pick-up to the vertical component of the earth's field, due to banking or pitching movement of the craft, singly or in combination, are prevented from being passed to the indicating or control device.

A further object resides in the provision of a novel arrangement of parts and circuits, whereby a remote indicating or controlling compass system is obtained which embodies the desirable features of simplicity of manufacture and installation, ready accessibility for repair and maintenance, low cost of production, improved accuracy of indication irrespective of pitch and bank motions of the craft, and decreased weight.

Other desirable features and advantages of the invention will appear more fully hereinafter from the following detailed description when taken in connection with the accompanying drawings illustrating one form of the invention. It is to be expressly understood, however, that the drawings are utilized for purposes of illustration only and are not to be taken as a definition of the limits of the invention, reference being had for this purpose to the appended claims.

In the drawings wherein similar reference characters refer to like parts throughout the several views;

Figure 1 is a diagrammatic view of a compass system constructed in accordance with the principles of the present invention, and Figure 2 is a wiring diagram of the various component parts of the system illustrated in Figure 1.

Referring more particularly to Figure 1, the present invention is illustrated therein as including a magnetic pick-up or earth inductor 10 which, as shown, is located within the wing or tail of the craft so as to be remotely positioned with respect to local interfering magnetic effects. Within the craft and arranged closely to the center of gravity thereof is an artificial gyroscopic horizon or gyro vertical 12 which may be connected with the pick-up or earth inductor 10 by an electrical cable 14, and with an indicator or control unit 16 by an electrical cable 17, the unit 16 being positioned within the instrument compartment of the craft and either employed as an indicator or as a control device to automatically control the heading of the craft. Suitable amplifying and other essential equipment may be housed within a container 18 and associated with the other elements of the system by cable connections 20 and 22.

As heretofore stated, the pick-up 10 is of the magnetic type and functions in accordance with the principle of operation of an open core transformer, the same including a fore and aft leg 24 lying parallel with the longitudinal axis of the craft, a transverse leg 26 arranged parallel to the transverse axis of the craft, and a pair of vertical legs 28 and 29 positioned vertically. While the particular construction of the individual legs of pick-up 10 forms no part of the present invention, the same constituting the subject matter of a copending application Serial No. 445,102, filed May 29, 1942 and now abandoned in favor of a continuing application Serial No. 151,402, filed March 23, 1950, a brief reference to the individual leg construction will, it is believed, facilitate a more complete understanding of the present invention, including the novel arrangement and cooperation of the mutually perpendicularly arranged legs 24, 26 and 28, 29 for the purposes herein set forth.

Each of the legs 24, 26, 28 and 29 is similar in construction and includes a pair of core members 30, 31 which are provided with individual input or energizing windings 32, 34 arranged in series opposed relation. Output windings 36, 38, 40 and 42 are associated with the respective pairs of input windings of the legs 24, 26, 28 and 29, respectively.

In the functioning and operation of the pick-up 10, a source of periodically varying current is supplied through leads 44 and 46 to all the input windings in series, Figure 2, and the magnitude of the source is such as to effect saturation of all of the core members. Under such conditions, when the core members are subjected to the action of a unidirectional field such as the earth's field, and as fully set forth in the aforesaid application, a second harmonic voltage will be induced in each of the output windings 36, 38, 40 and 42, the magnitude of such voltages being dependent upon the magnitude and relative direction of the components of the earth's magnetic field. With the mutually perpendicular arrangement of the legs as shown in Figure 1, it will be understood that if the craft is heading due north, in level flight, as indicated by the arrow N, a maximum voltage will be induced in the output winding 36 of leg 24 by the horizontal component of the earth's field while no voltage will be induced by said horizontal component in the output winding 38 of the leg 26 or in the output windings 40 and 42 of the vertical legs 28 and 29. On the other hand the vertical component of the earth's field will cause a maximum voltage to be induced in the output windings 40 and 42 of the legs 28 and 29 with no induced voltage in the output windings 36 and 38 of the respective legs 24 and 26. Any deviation of the craft from the assumed heading, while maintaining level flight, will vary the induced voltages in the output windings of legs 24 and 26, caused by the earth's horizontal component, depending upon the angle between said legs and said component.

In considering pitch or bank motions of the craft, it will be understood that such motions will likewise vary the induced voltages in the output windings of the various legs, in view of the variation in angularity between the axes of the legs and the vertical and horizontal components of the earth's field, such induced voltages representing a resultant or algebraic sum of the voltages due to the respective field components. Thus, when a pitch of the craft around the axis of leg 26 occurs, the induced voltage in leg 24 due to the earth's horizontal component will decrease, while the induced voltage due to the vertical component will increase. Simultaneously therewith, the voltages induced in the vertical legs 28 and 29 by the vertical component of the earth's field will decrease while the voltage induced by the horizontal component will increase.

In the event of a banking movement of the craft, around the axis of leg 24, and assuming that the heading of the craft is due north, the vertical legs 28 and 29 will have less voltage induced therein while the leg 26 will have more voltage induced in its output winding, due to the change in angularity between the legs and the vertical component of the earth's field. Since the legs still remain normal to the horizontal component, the latter will induce no voltage in the output coils of such legs.

In order to transmit the above described signal voltages to a remotely positioned indicating or control station, the present invention provides a novel means which is so constructed and arranged that the undesirable response of the pick-up 10 to the vertical component of the earth's field, due to pitch and bank of the craft, which would introduce serious errors in the directional or control mechanism is balanced out or nullified. As shown, Figure 2, such means comprises the gyro vertical 12, of well known construction, and which is preferably mounted in the instrument compartment of the craft, and near the center of gravity thereof, in order that it will not be subject to acceleration forces during irregular flight of the craft. More particularly, the gyro 12 comprises a casing 48 containing a rotatable member arranged to spin rapidly about a vertical axis, the casing being provided with the usual trunnions 50 and 52 which are oscillatably mounted in a gimbal 54. The latter is likewise provided with diametrically opposed trunnions 56 and 58 which are rotatably mounted in a fixed outer frame 60, the entire construction providing a gyro vertical or artificial horizon of a type well known in the art. It will be understood that in mounting the gyro 12 in the aircraft, the trunnions 50, 52 are arranged along the longitudinal axis, thus aligning trunnions 56, 58 along the transverse axis. Hence, trunnions 50, 52 define the bank axis of the craft while trunnions 56, 58 define the pitch axis.

For the purpose of securing the aforesaid balancing or compensating action, as regards the signal voltages derived from the vertical component of the earth's field, variable inductive take-off devices 60 and 62 are associated with the respective bank and pitch axes of the gyro 12. More particularly, inductive device 60, hereinafter called the bank device, comprises a pair of non-inductively related stator windings 64 and 66, carried by the gimbal 54 and a rotor winding 68 mounted for angular movement with the trunnion 50, the stator windings 64 and 66 being respectively connected with the output winding of the transverse and vertical legs 26 and 29, by the connections 68 and 70. The inductive device 62, hereinafter referred to as the pitch device, is constituted by a pair of non-inductively arranged stator windings 72 and 74 mounted upon a fixed part such as the frame 60, and a rotor winding 76 mounted in such a manner as to move angularly with the trunnion 58, the stator windings 72 and 74 being respectively connected through connections 78, 80 with the output windings of the fore and aft leg 24 and the vertical leg 28.

From the foregoing, it will be readily apparent that during normal level flight the rotors 68 and 76 of the respective bank and pitch devices 60 and 62 have maximum coupling with the stator windings 64 and 72. Since these latter windings are respectively connected to the transverse and fore and aft legs 26 and 24 which are positioned at right angles to each other in a horizontal plane, the outputs of said rotors may be combined to indicate the position of the craft with respect to the horizontal component of the earth's field. No voltage will be induced in these rotors on account of the undesirable vertical component of the earth's field, since the rotors are arranged at zero coupling with the respective stator windings 66 and 74 which are connected with the output windings of the vertical legs 28 and 29, respectively.

In the event of a pitch condition of the aircraft about the pitch axis 56, 58 relative movement between the trunnion 58 as well as rotor 76 mounted to move angularly therewith, and stator windings 72 and 74 will take place, the rotor decreasing its coupling with respect to the stator 72 and increasing its coupling with respect to the stator 74. It will also be recalled that during pitch, the response in the fore and aft leg 24, associated with stator 72, to the horizontal component of the earth's field is decreasing, while the response to the vertical component is increasing. On the other hand, the response in the vertical leg 28, associated with the stator 74, to the horizontal component of the earth's field, is increasing, while the response to the vertical component is decreasing. Since the variation in coupling between the rotor and stator windings of the pitch device 62 takes place proportionately to the decrease and increase in the induced voltages in the legs 24 and 28 due to the earth's field components, it will be readily apparent that the decrease in voltage induced in the rotor 76 by the horizontal signal component from stator 72, will be offset by the increase in voltage induced in said rotor by the horizontal signal component from stator 74, as the coupling varies as aforesaid. This action results in maintaining the voltage induced in the rotor 76, due to the horizontal component of the earth's field, at a value dependent solely upon the heading of the ship with respect to said horizontal component. It will be likewise readily apparent that although the voltage induced in the fore and aft leg 24 and the vertical leg 28, due to the vertical component of the earth's field, are respectively increasing and decreasing in the stator windings 72 and 74, the resultant voltage induced in the rotor 76 from the vertical signal components will be zero in view of the change in coupling. Thus, the undesired signals due to the vertical component is nullified and will not be passed to the rotor 76.

During the above described action of the system in response to the pitch condition of the aircraft, no variation in the signal voltage induced in the rotor 68 of the bank device 60 will occur, since said rotor is arranged to have zero coupling with respect to stator winding 66 connected with the vertical leg 29, and no signal is present in the stator 64 due to either of the components of the earth's field.

Should the aircraft be subjected to a banking movement about the bank axis 50, 52, the above described operation of the pitch device 62 will apply to the bank device 60, with the exception that no horizontal signal components are involved since the craft is assumed to be heading due north. In this condition, relative movement will occur between rotor winding 68 and stator windings 64, 66, the coupling with stator 64 decreasing and that with stator 66 increasing. Thus, as the voltages induced in the transverse leg 26 and the vertical leg 29, due to the vertical component of the earth's field, respectively increase and decrease and are reflected in the stator windings 64 and 66, still the resultant voltage induced in the rotor 68 from the undesirable vertical components will be zero in view of the change in coupling which takes place.

During a combined bank and pitch condition of the craft, it will be understood from the above that the described voltage interactions occur in both the bank and pitch devices 60 and 62 and that the respective rotors 68 and 76 will only reflect the signal voltages due to the horizontal component of the earth's magnetic field, the effect of the vertical component having been nullified by the novel arrangement of inductive devices associated with the bank and pitch axes of the gyro.

In order to combine and utilize the signal voltages induced in the rotor windings 68 and 76 of the respective bank and pitch devices 60 and 62, for directive indication or control purposes, such rotor windings are respectively connected, as by means of connections 82 and 84, with a pair of non-inductively arranged stator windings 86 and 88 of a variable inductive coupling device 90. The latter also includes a rotor winding 92, the output of which is connected to the variable field winding 94 of a two phase induction servo motor 96, as by means of connections 98, 100 and a suitable amplifier 102, for amplifying the output to a desired level. Motor 96 is provided with a fixed field winding 104, energized through connections including a frequency doubler 106, from a suitable source of periodically varying current, and the rotor 108 of the motor is connected through a suitable reduction gearing 110, with a rotatable shaft 112 of a master indicator 114. As shown, the shaft 112 is adapted to rotate the rotor winding 92 in order to vary its coupling with respect to the stator windings 86 and 88, the arrangement being such that the rotor will eventually reach a null position with respect to the stator windings. If desired, shaft 112 may carry a pointer 116 adapted to cooperate with a suitable compass scale, and it is understood that such shaft may also be connected with any suitable type of telemetric transmission system for the purpose of actuating the necessary control surfaces of the craft in order to secure automatic steering in response to control movements of said system.

It is believed that the operation of the system will be clear from what has been set forth hereinbefore. As previously described, with the magnetic pick-up fixedly arranged in the wing or tail of the craft, with the leg 24 positioned parallel to the longituidnal axis, all undesirable signals derived from the vertical component of the earth's magnetic field due to banking and pitching of the aircraft are balanced out or nullified by the novel arrangement of the bank and pitch devices 60 and 62 in combination with the gyro vertical 48. In other words, in the event of a pitch condition, it has heretofore been demonstrated that all signals passed from the stator windings 72 and 74 of the pitch device 62, due to vertical component signals picked up by the fore and aft leg 24 and the vertical leg 28, to the rotor 76, will be balanced out, as the coupling between the rotor 76 and said stator windings is varied, and no resultant vertical component signal will be present in the rotor.

On the other hand, it has likewise been pointed out in detail that in the event of a bank condition, all signals passed from the stator windings 64 and 66 of the bank device 60, due to vertical component signals picked up by the transverse leg 26 and the vertical leg 29, to the rotor 68, will be balanced out as the coupling between the rotor 68 and said stator windings is varied, and no resultant vertical component signal will be present in the rotor.

Moreover, should a combined bank and pitch movement occur the voltage reactions previously set forth are such that here again, no resultant signal voltages due to the earth's vertical component will be present in either of the rotor windings 68 or 76 and these windings will only reflect the signals derived by the various legs 24, 26, 28 and 29 in accordance with the angularity thereof with the horizontal component of the earth's field.

In considering the operation of the coupling device and parts associated therewith, if it be assumed that the craft is heading due north as indicated by the arrow N, the winding 92 of inductive device 90 will occupy a null position with respect to the stator windings 86 and 88, and the indicator pointer 116 will indicate north. If the craft now heads west, for example, the leg 24 will no longer be responsive to the earth's horizontal component, and all signals due to the horizontal component will disappear from the windings 72, 76 and 88. Leg 26 on the other hand will receive a maximum signal from the earth's horizontal component, and a maximum voltage will be induced in the rotor winding 68 of the bank device 60 and transmitted to the stator winding 86 of the coupling device 90. This will cause a voltage to be induced in the rotor winding 92, which, when amplified and transmitted to the field winding 94 of the motor 96, initiates rotation of the latter to return the rotor to a new null position through operation of the reduction gearing 110 and shaft 112. When this new null position is reached, the pointer 116 indicates west on the scale, no further effective voltage is present in the rotor winding 92 and the motor 96 comes to rest.

Any variation in heading which results in both of the rotor windings 68 and 76 receiving signal voltages due to the earth's horizontal component, will cause a combined interaction upon the rotor winding 92 which is representative of the algebraic sum of the signal voltages applied to the stator windings 86 and 88. Here again, the motor 96 will be rendered operative to move the rotor 92 and indicator pointer 116, and motor rotation will cease as soon as the null position, corresponding to the heading of the craft, has been attained.

The present invention thus provides a novel arrangement for securing course indication or control by a stationary inductive device without the necessity of stabilizing the device in azimuth, thus avoiding the heavy and bulky apparatus heretofore required. While the inductive device is subjected to the undesirable effects of the vertical component of the earth's field, still such effects are effectively balanced out and nullified by the novel gyro vertical and inductive take-offs which are employed in association with the pitch and bank axes thereof. Thus, all vertical component signals are prevented from being transmitted to the indicating or control mechanism, so that the latter responds solely to the desirable horizontal component of the earth's field. A further important advantage resides in the ability to place the gyro within the craft in a location where it is not subjected to objectionable acceleration forces as heretofore, such location also enabling ready inspection of the unit for maintenance and repair.

While only one embodiment of the invention has been disclosed and described herein with considerable particularity, various changes may be made in the relative location of the parts and in the circuit arrangements shown, as will be readily understood by those skilled in the art, without departing from the scope of the invention. Reference will therefore be had to the appended claims for a definition of the limits of the invention.

What is claimed is:

1. Mechanism for providing a magnetic direction reference from the earth's magnetic field to enable the steering of a craft along a predetermined magnetic heading, comprising non-stabilized earth inductor means adapted to be fixedly mounted upon the craft for angular movements therewith about the longitudinal and transverse axes of the craft and responsive to both the horizontal and vertical components of the earth's magnetic field for producing electro-magnetic effects therefrom, electro-magnetically operated controlling means, and stabilized means interconnecting said earth inductor means and said controlling means for eliminating the electromagnetic effects of one of said components of the earth's magnetic field, to actuate said controlling means in response to the electro-magnetic effects of the other of said components of the earth's magnetic field.

2. Mechanism for providing a magnetic direction reference from the earth's magnetic field to enable the steering of a craft along a predetermined magnetic heading, comprising non-stabilized earth inductor means adapted to be fixedly mounted upon the craft for angular movements therewith about the longitudinal and transverse axes of the craft and responsive to both the horizontal and vertical components of the earth's magnetic field for producing electro-magnetic effects therefrom, electro-magnetically operated controlling means, and stabilized means interconnecting said earth inductor means and said controlling means for eliminating the electro-magnetic effects of the vertical component of the earth's magnetic field, to actuate said controlling means in response to the electro-magnetic effects of the horizontal component of the earth's magnetic field.

3. Mechanism for producing a magnetic direction reference from the earth's magnetic field to enable the steering of a craft along a predetermined magnetic heading, comprising non-stabilized earth inductor means adapted to be fixedly mounted upon the craft for angular movements therewith about the longitudinal and transverse axes of the craft and responsive to both the horizontal and vertical components of the earth's magnetic field for producing electro-magnetic effects therefrom, electro-magnetically operated controlling means, and gyroscopically controlled means interconnecting said earth inductor means and said controlling means for eliminating the electro-magnetic effects of one of said components of the earth's magnetic field to actuate said controlling means in response to the electro-magnetic effects of the other of said components of the earth's magnetic field.

4. Mechanism for producing a magnetic direction reference from the earth's magnetic field to enable the steering of a craft along a predetermined magnetic heading, comprising non-stabilized earth inductor means adapted to be fixedly mounted upon the craft for angular movements therewith about the longitudinal and transverse axes of the craft and responsive to both the horizontal and vertical components of the earth's magnetic field for producing electro-magnetic effects therefrom, electro-magnetically operated controlling means, and gyroscopically controlled means interconnecting said earth inductor means and said controlling means for eliminating the electro-magnetic effects of the vertical component of the earth's magnetic field to actuate said controlling means in response to the electro-magnetic effects of the horizontal component of the earth's magnetic field.

5. Mechanism for producing a magnetic direction reference from the earth's magnetic field to enable the steering of a craft along a predetermined magnetic heading, comprising non-stabilized earth inductor means adapted to be fixedly mounted upon the craft for relative angular movements therewith about the longitudinal and transverse axes of the craft and responsive to both the horizontal and vertical components of the earth's magnetic field, said earth inductor means including a plurality of earth inductor elements mutually perpendicular to each other, electro-magnetically operated controlling means adapted to be positioned remotely from said earth inductor means, a vertical gyroscope adapted to be mounted upon the craft remotely from said earth inductor means and said controlling means for relative angular movements with respect to the craft during angular movements of the craft about its longitudinal and transverse axes, a plurality of take-off means each of which includes a stator means and a rotor means, each of said stator means being electrically connected to said earth inductor means and operatively associated with its respective rotor means for eliminating the electro-magnetic effects of the vertical component of the earth's magnetic field, one of said rotor means being actuated by said gyroscope upon relative angular movement thereof about one axis and the other of said rotor means being actuated by said gyroscope upon relative angular movement thereof about the other axis, and means connecting said rotor means to said electro-magnetically operated controlling means for actuating the latter in response to the electro-magnetic effects of the horizontal component of the earth's magnetic field.

6. Mechanism for producing a magnetic direction reference from the earth's magnetic field to enable the steering of a craft along a predetermined magnetic heading, comprising non-stabilized earth inductor means adapted to be fixedly mounted upon the craft for angular movements therewith about the longitudinal and transverse axes of the craft and including means for deriving a pair of signals from only the horizontal component of the earth's magnetic field when the craft is in level position but responsive to both the horizontal and vertical components of the earth's magnetic field when the craft moves angularly about its longitudinal and transverse axis and means for deriving a pair of signals from only the vertical component of the earth's magnetic field when the craft is in level position but responsive to both the vertical and horizontal components of the earth's magnetic field when the craft moves angularly about its longitudinal and transverse axes, electro-magnetically operated controlling means positioned remotely from said earth inductor means, a vertical gyroscope adapted to be mounted upon the craft remotely from said earth inductor means and said controlling means for relative angular movements with respect to the craft during angular movements of the craft about its longitudinal and transverse axes, a plurality of take-off means each of which includes a stator means and a rotor means, each of said stator means being electrically connected to the means deriving signals from the horizontal component when in a level position and operatively associated with its respective rotor means for eliminating the signals derived from the vertical component of the earth's magnetic field, one of said rotor means being actuated by said gyroscope upon relative angular movement thereof about one axis and the other of said rotor means being actuated by said gyroscope upon relative angular movement thereof about the other axis, and means connecting said rotor means to said electro-magnetically operated controlling means for actuating the latter in response to the signals derived from the horizontal component of the earth's magnetic field.

7. Mechanism for producing a magnetic direction reference from the earth's magnetic field to enable the steering of a craft along a predetermined magnetic heading, comprising non-stabilized earth inductor means adapted to be fixedly mounted upon the craft for relative angular movements therewith about the longitudinal and transverse axes of the craft, said earth inductor means including a plurality of angularly related earth inductor elements arranged to be responsive only to the horizontal component of the earth's magnetic field when the craft is in level position but responsive to both the horizontal and vertical components of the earth's magnetic field when the craft moves angularly about its longitudinal and transverse axes, a plurality of earth inductor elements arranged to be responsive only to the vertical component of the earth's magnetic field when the craft is in level position but responsive to both the vertical and horizontal components of the earth's magnetic field when the craft moves angularly about its longitudinal and transverse axes, electro-magnetically operated controlling means adapted to be positioned remotely from said earth inductor means, a vertical gyroscope adapted to be mounted upon the craft for relative angular movements with respect to the craft during angular movements of the craft about its longitudinal and transverse axes, a pair of take-off means associated with said gyroscope and each of which includes a stator means and a rotor means, each of said stator means being electrically connected to the earth inductor elements responsive to the horizontal component of the earth's magnetic field when the craft is in level position and to the earth inductor elements responsive only to the vertical component of the earth's magnetic field when the craft is in level position, each of said stator means being operatively associated with its respective rotor means for eliminating the electro-magnet effects of the vertical component of the earth's magnetic field, one of said rotor means being actuated by said gyroscope upon relative angular movement thereof about one axis and the other of said rotor means being actuated by said gyroscope upon relative angular movement thereof about the other axis, and means connecting both of said rotor means to said electro-magnetically operated controlling means to combine all the electro-magnetic effects of the horizontal component of the earth's magnetic field for actuating said electro-magnetically operated controlling means.

8. A magnetic compass system for movable craft, comprising non-stabilized earth inductor means adapted to be fixedly mounted upon the craft for relative angular movements therewith about the longitudinal and transverse axes of the craft, said earth inductor means including a pair of angularly related earth inductor elements arranged to be responsive only to the horizontal component of the earth's magnetic field when the craft is in level position but responsive to both the horizontal and vertical components of the earth's magnetic field when the craft moves angularly about its longitudinal and transverse axes, a second pair of earth inductor elements arranged to be responsive only to the vertical component of the earth's magnetic field when the craft is in level position but responsive to both the vertical and horizontal components of the earth's magnetic field when the craft moves angularly about its longitudinal and transverse axes, a vertical gyroscope adapted to be mounted upon the craft for relative angular movements with respect thereto during angular movements thereof about its longitudinal and transverse axes, a pair of take-off means associated with said gyroscope and each of which includes a stator means and a rotor means, each of said stator means being electrically connected to the earth inductor means responsive only to the horizontal component of the earth's magnetic field when the craft is in level position and to the earth inductor elements responsive only to the vertical component of the earth's magnetic field when the craft is in level position, each of said stator means being operatively associated with its respective rotor means for eliminating the electromagnetic effects of the vertical component of the earth's magnetic field, one of said rotor means being actuated by said gyroscope upon relative angular movement thereof about one axis and the other of said rotor means being actuated by said gyroscope upon relative angular movement thereof about the other axis, electro-magnetically operated indicating means, and means connecting both of said rotor means to said electro-magnetically operated indicating means to combine all the electro-magnetic effects due to response of said earth inductor elements to the horizontal component for actuating said indicating means.

9. Mechanism for indicating the heading of a craft in accordance with the relative position of the craft with respect to the horizontal component of the earth's magnetic field, comprising means for deriving signals from the horizontal and vertical components of the earth's magnetic field in accordance with the heading, pitch and roll conditions of the craft, a vertical gyroscope adapted to be mounted upon the craft for relative angular movements with respect thereto during angular movements thereof about its longitudinal and transverse axes, a pair of take-off means associated with said gyroscope and each of which includes a stator means and a rotor means, each of said stator means being electrically connected to said signal deriving means and inductively coupled to its respective rotor means for eliminating the signals derived from the vertical component of the earth's magnetic field regardless of the attitude of the craft, one of said rotor means being actuated by said gyroscope upon relative angular movement thereof about one axis and the other of said rotor means being actuated by said gyroscope upon relative angular movement thereof about the other axis, electro-magnetically operated indicating means, and means connecting both of said rotor means to said indicating means for utilizing the signals derived from the horizontal component of the earth's magnetic field regardless of the attitude of the craft, to actuate said indicating means in accordance with said signals for indicating the heading of the craft.

10. A magnetic compass system for aircraft, comprising a pair of mutually perpendicular earth inductor elements positioned to be responsive only to the horizontal component of the earth's magnetic field when the aircraft is in level flight, a second pair of earth inductor elements positioned to be responsive only to the vertical component of the earth's magnetic field when the craft is in level flight, an artificial horizon gyroscope adapted to be mounted upon the craft for relative angular movements therewith during angular movements thereof about its longitudinal and transverse axes, a pair of inductive take-off means associated with said gyroscope each of which includes a stator means and a rotor means, each of said stator means being electrically connected to both pairs of said earth inductor elements and inductively coupled to its respective rotor means for eliminating the electro-magnetic effects of the vertical component of the earth's magnetic field upon actuation of the rotor means, one of said rotor means being actuated by said gyroscope upon relative angular movement thereof about one axis and the other of said rotor means being actuated by said gyroscope upon relative angular movement thereof about the other axis, and indicating means connected to both of said rotor means for indicating the heading of the craft in response to the electro-magnetic effects of the horizontal component of the earth's magnetic field.

11. Mechanism for indicating magnetic direction, comprising non-stabilized earth inductor means adapted to be fixedly mounted upon a craft for relative angular movements therewith about the longitudinal and transverse axes of said craft, said earth inductor means including a plurality of earth inductor elements having their axes mutually perpendicular to each other for generating signals in response to the horizontal and vertical components of the earth's magnetic field, an artificial horizon gyroscope adapted to be mounted upon the craft for relative angular movements with respect thereto during angular movements thereof about its longitudinal and transverse axes, a pair of variable inductive elements each of which comprises two stationary coils 90° out of phase geometrically with respect to each other and a rotatable coil in inductive relation with said two stationary coils, the stationary coils of said inductive elements being electrically connected to said earth inductor elements, one of said rotatable coils being actuated by said gyroscope upon relative angular movement thereof about one axis and the other of said rotatable coils being actuated by said gyroscope upon relative angular movement thereof about the other axis, thereby varying the inductive coupling between the stationary coils and the rotatable coil of each of said inductive elements to eliminate the signals produced by the vertical component of the earth's magnetic field, and indicating means including means connected to the rotatable coils of said inductive elements for actuating said indicating means in response to the signals produced by the horizontal component of the earth's magnetic field to indicate magnetic direction.

12. Mechanism for indicating magnetic direction, comprising non-stabilized earth inductor means adapted to be fixedly mounted upon a craft for relative angular movements therewith about the longitudinal and transverse axes of the craft, said earth inductor means including a plurality of earth inductor elements having their axes mutually perpendicular to each other and adapted to generate signals in response to the horizontal and vertical components of the earth's magnetic field, an artificial horizon gyroscope adapted to be mounted upon the craft for relative angular movements with respect thereto during angular movements thereof about its longitudinal and transverse axes, a pair of variable inductive elements, each of which comprises two stationary coils 90° out of phase geometrically with respect to each other and a rotatable coil in inductive relation with said two stationary coils, one of the stationary coils of each of said inductive elements being connected to certain of said earth inductor elements responsive only to the horizontal component of the earth's magnetic field when the craft is in level position and the other of said stationary coils of each of said inductive elements being connected to other of said earth inductor elements responsive only to the vertical component of the earth's magnetic field when the craft is in level position, the rotatable coil of one of said inductive elements being actuated by said gyroscope upon relative angular movement thereof about one axis and the other of said rotatable coils being actuated by said gyroscope upon relative angular movement thereof about the other axis, whereby the magnetic coupling between each rotatable coil and its associated stationary coils is varied to eliminate the signal produced by the vertical component of the earth's magnetic field, and indicating means including means connected to both of said rotatable coils for actuating said indicating means in response to the horizontal component of the earth's magnetic field for indicating magnetic direction.

13. Mechanism for providing a magnetic direction reference on a craft from the earth's magnetic field, comprising non-stabilized earth inductor means adapted to be fixedly mounted on the craft for angular movements therewith about the longitudinal and transverse axes thereof for producing electrical signals from the horizontal and vertical components of the earth's magnetic field, electrically operated controlling means, means adapted to be mounted on the craft for response to angular movements of the craft about its longitudinal and transverse axes, and means for electrically interconnecting said earth inductor means and said controlling means, including means actuated by the means responsive to the angular movements of the craft for eliminating the signals produced from one of the components of the earth's magnetic field, to actuate said controlling means in response to the signals produced from the other component of the earth's magnetic field.

14. Mechanism for providing a magnetic direction reference on a craft from the earth's magnetic field, comprising non-stabilized earth inductor means adapted to be fixedly mounted on the craft for angular movements therewith about the longitudinal and transverse axes thereof for producing electrical signals from the horizontal and vertical components of the earth's magnetic field, electrically operated controlling means, means adapted to be mounted on the craft for response to angular movements of the craft about its longitudinal and transverse axes, and means for electrically interconnecting said earth inductor means and said controlling means, including means actuated by the means responsive to the angular movements of the craft for eliminating the signals produced from the vertical component of the earth's magnetic field, to actuate said controlling means in response to the signals produced from the horizontal component of the earth's magnetic field.

15. Mechanism for providing a magnetic direction reference on a craft from the earth's magnetic field, comprising non-stabilized earth inductor means adapted to be fixedly mounted on the craft for angular movements therewith about the longitudinal and transverse axes thereof for producing electrical signals from the horizontal and vertical components of the earth's magnetic field, electrically operated controlling means, a vertical gyroscope adapted to be mounted on the craft for response to angular movements of the craft about its longitudinal and transverse axes, and means for electrically interconnecting said earth inductor means and said controlling means, including means actuated by said gyroscope upon relative angular movement between it and said craft about said longitudinal and transverse axes for eliminating the signals produced from one of the components of the earth's magnetic field, to actuate said controlling means in response to the signals produced from the other component of the earth's magnetic field.

16. Mechanism for providing a magnetic direction reference on a craft from the earth's magnetic field, comprising non-stabilized earth inductor means adapted to be fixedly mounted on the craft for angular movements therewith about the longitudinal and transverse axes thereof for producing electrical signals from the horizontal and vertical components of the earth's magnetic field, electrically operated controlling means, a vertical gyroscope adapted to be mounted on the craft for response to angular movements of the craft about its longitudinal and transverse axes, and means for electrically interconnecting said earth inductor means and said controlling means, including means actuated by said gyroscope upon relative angular movement between it and said craft about said longitudinal and transverse axes for eliminating the signals produced from the vertical component of the earth's magnetic field, to actuate said controlling means in response to the signals produced from the horizontal component of the earth's magnetic field.

PAUL A. NOXON.

REFERENCES CITED

The following references are of record in the file of this patent:

UNITED STATES PATENTS

| Number | Name | Date |
|---|---|---|
| 1,968,542 | Tear | July 31, 1934 |
| 2,241,499 | Barth | May 13, 1941 |
| 2,357,319 | Esval et al. | Sept. 5, 1944 |
| 2,393,670 | White | Jan. 29, 1946 |
| 2,459,830 | McCarthy | Jan. 25, 1949 |

FOREIGN PATENTS

| Number | Country | Date |
|---|---|---|
| 591,019 | Great Britain | Aug. 5, 1947 |
| 624,083 | Great Britain | May 27, 1949 |
| 666,594 | Germany | Oct. 24, 1948 |